United States Patent

[11] 3,585,907

[72] Inventor Kurt Rochla
 Lengerich, Germany
[21] Appl. No. 870,986
[22] Filed Sept. 18, 1969
 Division of Ser. No. 487,277, Sept. 14, 1965
[45] Patented June 22, 1971
[73] Assignee Windmöller & Hölscher
 Lengerich, Germany
[32] Priority Dec. 28, 1964
[33] Germany
[31] W38,257VIIb/54b

[54] PROCESS FOR MANUFACTURING VALVED AND GUSSETED SACKS FROM PLASTICS MATERIAL
 3 Claims, 9 Drawing Figs.
[52] U.S. Cl. .................................................. 93/35,
 93/84, 93/94
[51] Int. Cl. ......................................................... B31b 49/04,
 B31f 7/00, B31b 1/84
[50] Field of Search ........................................... 93/8, 20,
 35, 82, 84, 94

[56] References Cited
 UNITED STATES PATENTS
3,193,180 7/1965 Lissner ........................... 229/62.5
3,214,312 10/1965 Gattrugeri ..................... 93/8 (V.B.)
3,215,048 11/1965 Gattrugeri ..................... 93/8 (V.B.)
3,250,187 5/1966 Kasting .......................... 93/8 (V.B.)
3,262,634 7/1966 Goodwin ....................... 229/62.5
3,272,093 9/1966 Brockmuller ................. 93/8 (V.B.)
3,279,330 10/1966 Harding ......................... 93/35
3,280,705 10/1966 Gennerich .................... 93/35
3,352,737 11/1967 Jordan ........................... 93/8 (V.B.)
3,355,997 12/1967 Heimos ......................... 93/35
3,373,664 3/1968 Brockmuller ................. 93/8 (V.B.)
3,431,829 3/1969 Goodwin ....................... 93/35

*Primary Examiner*—Wayne A. Morse, Jr.
*Attorney*—Fleit, Gipple and Jacobson

ABSTRACT: A process is disclosed for manufacturing valved and gusseted sacks of plastic material commencing with a flat web of plastic and initially overlapping its edges and heat sealing to form a tube. A plurality of valved patches at spaced locations are sealed to the edge of one side of the web before the tube is formed and are joined to the other edge of the web during the formation of the heat-sealed seam. Thereafter, the tube is flattened with the heat-sealed seam spaced from both edges but closer to one. Finally, gussets are formed in the side edges of the tube in such a way that the heat-sealed seam lies at an outer gusset fold.

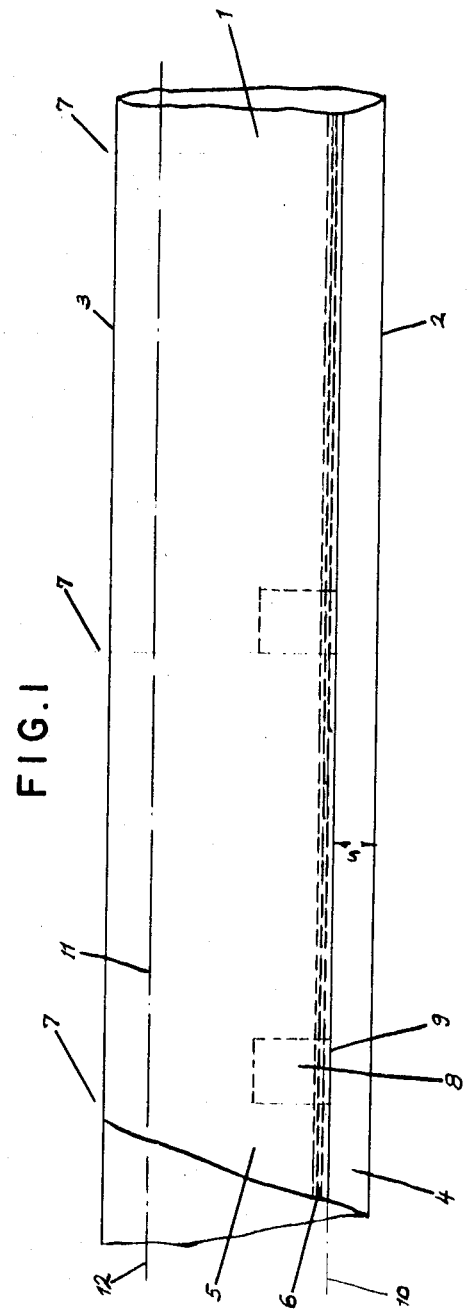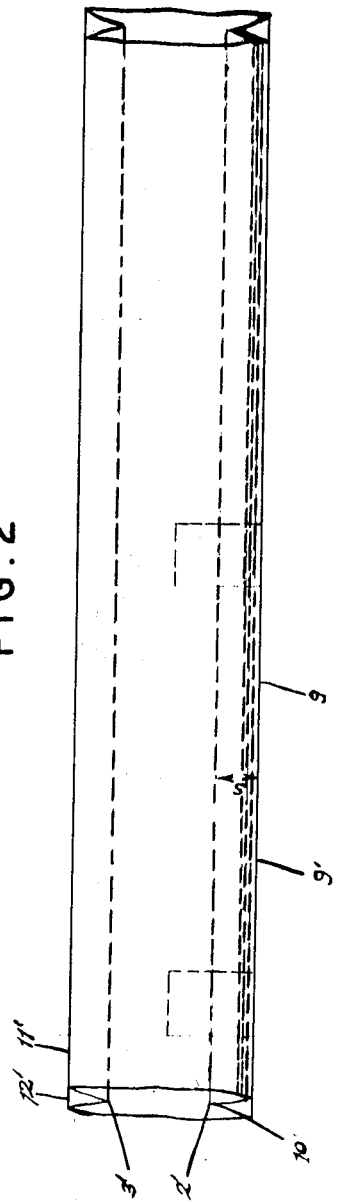

FIG.4
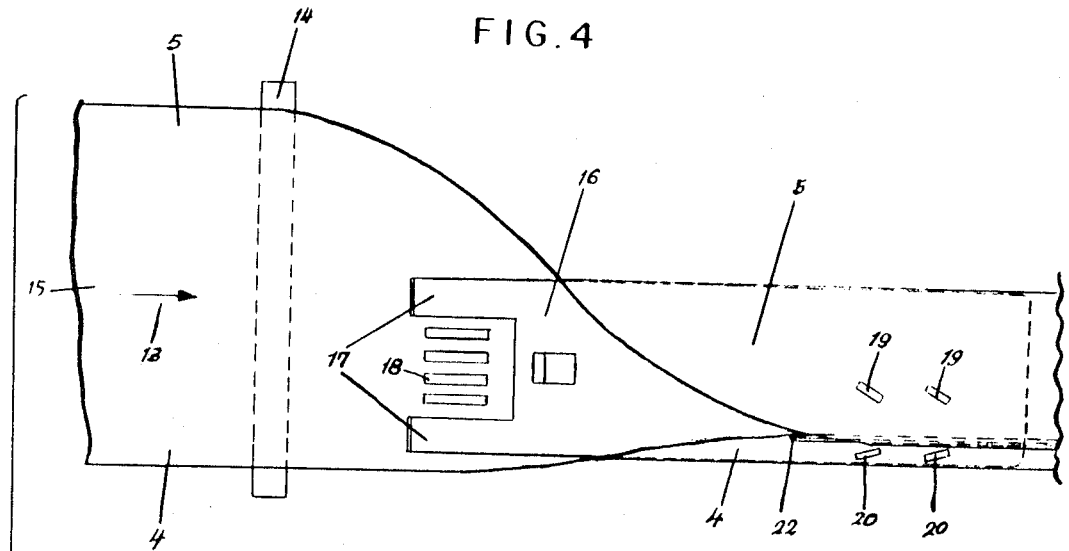
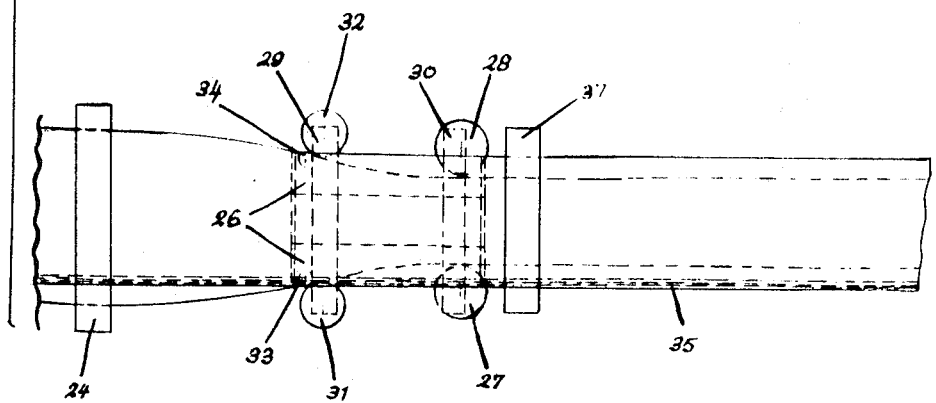
Inventor
Kurt Rochla
Fleit, Gipple & Jacobson
Attorneys

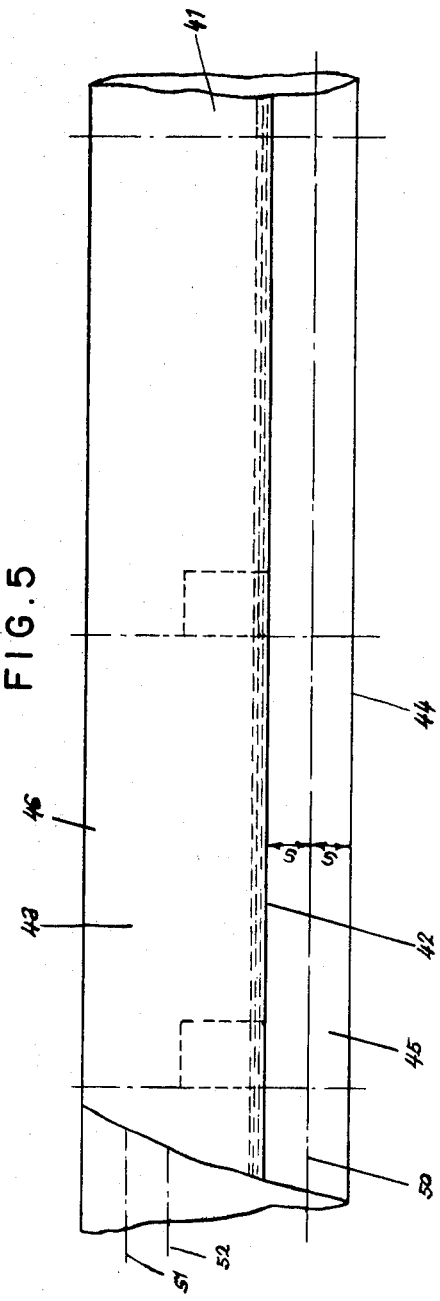
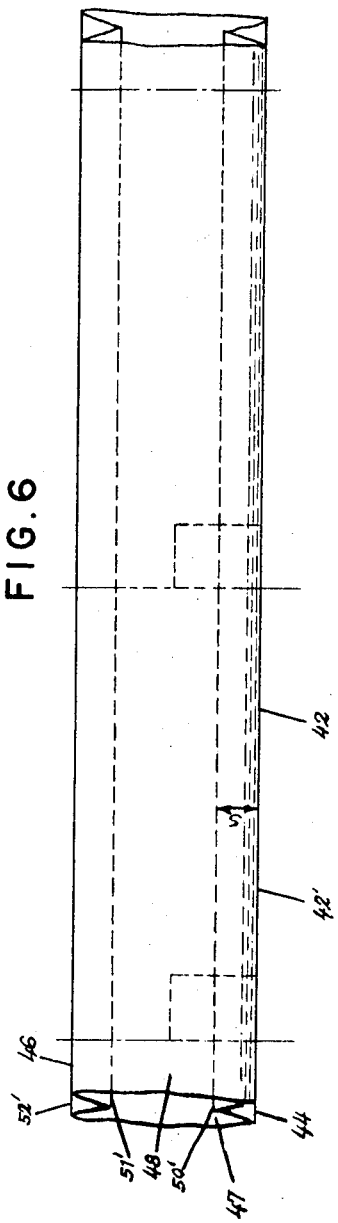

Inventor
Kurt Rochla

Fleit, Gipple & Jacobson
Attorneys

PATENTED JUN 22 1971 3,585,907

Inventor
Kurt Rochla

Fleit, Gipple & Jacobson
Attorneys

PROCESS FOR MANUFACTURING VALVED AND GUSSETED SACKS FROM PLASTICS MATERIAL

This application is a division of Ser. No. 487,277, filed Sept. 14, 1965.

In a particularly simple process of manufacturing valved and gusseted sacks from single-ply webs of plastics material, the valve patches are secured to one of the edges of the web before the same is formed into a tube. Then the side portions of the web are turned over so that the edges overlap, and the overlapping edges are joined by heat-sealing with the aid of a hot extruded bead of plastics material, which is introduced between the edges. In the finished gusseted sack obtained by severing tubing sections and providing them with heat-sealed closing seams, the valve is disposed in the longitudinal seam.

As the two side portions of the web, which have edges that are to be overlapped and joined by heat-sealing, must be guided and held together, the longitudinal seam cannot be disposed exactly at a side edge, mainly in view of the smoothness of the webs of plastic material, particularly when gussets are to be tucked in while the tube is being formed. During the overlapping and heat-sealing operation, a turned-over margin of considerable width must be available between the side edge and the heat-sealed seam for an engagement with holding-down and guide rollers which are disposed at an oblique angle to the direction of movement of the web.

Just as the heat-sealed seam, the outer opening of the valve is disposed toward the center of the front ply of the sack and the opening of the valve discharging into the interior of the sack, is spaced still further from the side edge. This renders the filling operation very difficult. The free space which is left toward the opposite sidewall of the sack is insufficient for a smooth inflow of the material to be filled into the sack. When the sack is filled by means of a vertical filling pipe, the sack is unduly buckled. Finally, it is difficult to open the valve which lies in the surface of the sack. A longitudinal seam extending along the edge of the tube is also desired because the entire wall of the tube will then be available for receiving printed matter throughout the surface.

In a process of manufacturing valved and gusseted sacks of plastic material, which comprises turning over the side portions of a flat web of plastic material sheeting and joining its overlapping edges by heat-sealing to form a tube, which is subsequently processed to form individual sacks, applying the valve patches to the edge of the side portion of the web before the tube is formed, and joining the valve patches by heat-sealing to the other edge of the web during the formation of the heat-sealed seam, all these difficulties are avoided according to the invention in that a flat tube is initially formed, which has a heat-sealed seam spaced from both side edges, gussets are subsequently tucked in known manner, and that portion of the narrower one of the original side portions of the web lies between one side edge of the flat tube and the heat-sealed seam is used in forming the gussets. Thus, the longitudinal seam can be formed at the previously usual distance from the side edge of the tube. According to the invention, however, that portion of the upper ply of the tube which is disposed between the tube edge and the heat-sealed seam is included in the gusset which is now to be formed. The outer valve opening is then disposed directly at a side edge of the finished sack, as is desired.

The heat-sealed seam may be spaced from the edge of the flat tube by the desired gusset depth and both edges of the flat tube may be tucked in during the formation of the gussets. This process is desirable if an infolded side portion having a width which is equal to one-half the desired depth of a gusset is sufficient for a good infolding and guiding during the formation of the tube and of the heat-sealed seam. Alternatively, it is within the scope of the invention to form the heat-sealed seam at a distance from the edge of the flat tube which is twice the desired gusset depth and to form the gusset which is adjacent to the valve so that its inside edge is disposed midway between the edge of the flat tube and the heat-sealed seam. This process, in which each gusset is formed in known manner from a single tube ply and the side edges of the flat tube are preserved as side edges of the finished sack, will be desirable if an infolded portion having a width equal to the gusset depth is not sufficient for a reliable manufacture of the flat tube because in this process the infolded side portion is twice as large as in the previously described, conventional process.

A tube-making machine for manufacturing gusseted tubes by the process according to the invention is characterized in that a known apparatus for forming a flat tube is succeeded by a known gusseting device. To prevent a propagation as far as to the tube-forming apparatus of the action of the gusseting device tending to pull the tube open, because such action could interfere at the tube-forming apparatus with a proper heat-sealing, a development of the invention provides a pair of rolls which flatten the tube between the tube-forming device and gusseting device. To enable the formation of each of the two gussets from a single ply of the flat tube, in the manner which has been described, the gusseting device may be preceded in known manner by a device for turning the plane of the tube web relative to the center plane of the gusseting device.

The invention will be explained more fully hereinafter with reference to the drawings, in which illustrative embodiments are diagrammatically shown. In the drawings:

FIG. 1 shows a flat tube which has been made according to the invention and in which the distance of the heat-sealed seam from the edge of the flat tube equals the depth of the desired gussets.

FIG. 2 shows the tube of FIG. 1 after the formation of the gussets.

FIG. 4 is a top plan view showing the tube-making machine of FIG. 3.

FIG. 5 shows a flat tube, in which the distance from the heat-sealed seam to the edge of the flat tube is twice the depth of the desired gusset.

FIG. 6 shows the tube of FIG. 5 after the formation of the gussets.

Figure 3:
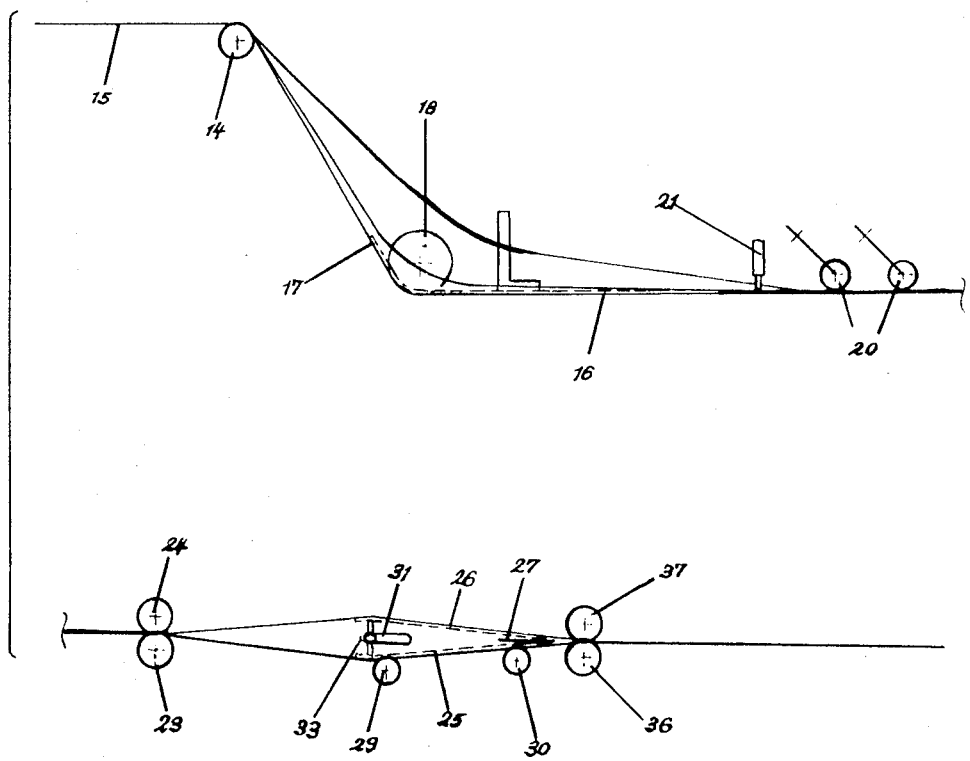
FIG. 3 is a diagrammatic side elevation showing a tube-making machine for manufacturing the gusseted tube of FIG. 2.

The flat tube 1 (FIG. 1) having side edges 2 and 3 has been formed from an open web of plastic material by infolding and overlapping the side portions 4 and 5 of the web and forming a longitudinal seam 6 with the aid of an extruded bead of plastic material, which is supplied at an elevated temperature. Valve patches 8 are incorporated in the longitudinal seam and are spaced apart by the pitch of the transverse lines of severance 7 to be subsequently formed. The valve openings are disposed at and below the edge 9 of the upper side portion 5 of the web.

The flat tube 1 is formed so that the edge 9 is at a distance $s$ from the edge 2 of the flat tube. $s$ is the desired depth of the gussets, which are to be subsequently formed in such a manner that the edges 2 and 3 of the flat tube form inner edges 2' and 3' (FIG. 2). The web edge 9 forms then a side edge 9' of the tube. Fold lines 10, 11 and 12 indicated in dash-dot lines in FIG. 1 form the remaining new side edges 10', 11' and 12' of the tube.

When the gussets have been formed, the longitudinal seam edge 9 and the valve openings are disposed at the side edge of the finished gusseted tube. Nevertheless, the side portion 4 of the web was available during the formation of the flat tube for an engagement by oblique rollers.

In FIGS. 3 and 4, a known device for forming a flat tube is shown on the left. The web 15 of plastic material is supplied in the direction of arrow 13 over an elevated guide roller 14. The side portions 4 and 5 of said web are deflected about the curved ends of the tube-shaping plate 16 and deflecting rollers 18 and held by obliquely set pressure rollers 19 and 20, which are rotated by the web and exert on the side portions of the web a tension which tends to move said side portions toward each other. An extruder 21 (FIG. 3) supplies a hot bead 22 of plastic material 22 (FIG. 4) onto the lowermost side portion 4 of the web to form the longitudinal seam. According to the invention, the tube-shaping plate 16 may have rounded, enlarged outer edges so that the tube is formed with rounded side edges and the material is not weakened when the side edges are subsequently reversed during the formation of the gussets. If the tube-forming device is provided in known manner with flat, rotary discs at the edges, these discs may also be provided with thick, rounded edges. Even without these features, the edges of the flat tube are less sharp and less endangered during their reversal than the edges of the extruded seamless flat tubes, which are rolled flat when they are still warm.

A pair of rolls 23, 24, for preventing an action tending to pull open the flat tube being formed, is disposed between the device for forming the flat tube and the succeeding, known device for forming symmetrical gussets. The distance from the rolls to the gusseting device is sufficient to enable an opening of the flat tube. The gusseting device comprises essentially size plates 25, 26, which are disposed inside the tube. These plates initially pull open the tube to a rectangle and then converge in the direction of movement. The device comprises further the rotating flat discs 27, 28, which act on the tube from the outside to tuck in the gussets. The size plates are supported by rotary rollers 29 and 30, which are disposed outside and below the tube, and are held against a movement in the direction of movement of the tube by rollers 31 and 32, which are disposed laterally and outwardly of the tube. Rollers 33 and 34 are rotatably mounted on the plates and bear on the rollers 31 and 32. The finished gusseted tube having a longitudinal seam 35 at one edge is withdrawn by a pair of feed rolls 36, 37. The folds of the tube are then pressed. In FIG. 4, the valve patches have not been shown for the sake of simplicity.

If a narrower side portion of the web having a width corresponding to the depth of the gusset to be subsequently formed is not sufficient for a guidance of this portion during the formation of the flat tube, the flat tube 41 may be formed in accordance with FIG. 5 in such a manner that the distance 2s from the edge 42 of the upper side portion 43 of the web to the side edge 44 of the flat tube, which latter side edge defines the lower side portion 45 of the web, equals twice the depth of the gusset to be subsequently formed. The edges 44 and 46 of the flat tube are preserved as side edges of the subsequent gusseted tube shown in FIG. 6. The edge 44 is disposed at the lower ply 47 of the tube and the edge 46 is disposed at the upper ply 48 of the tube. To form the gussets, a strip of the upper ply of the flat tube and a strip of the lower ply of the flat tube are folded into zigzag shape. Each of these strips has the width 2s. The edge 42 and the fold lines 50—52 indicated by dash-dot lines in FIG. 5 form the edges 42' and 50' to 52' in the gusseted tube. The edges 42' and 52' form the new side edges of the upper and lower plies, respectively, of the gusseted tube. Thus, the edge 42 provided with the valve openings is disposed at the side edge 42' of the gusseted tube, as desired, whereas this edge 42 was originally at a distance corresponding to twice the gusset depth from the side edge 44 of the flat tube. For this reason, the process illustrated in FIGS. 5 and 6 ensures a satisfactory formation of the flat tube by the application of oblique rollers even in the case of side folds having a relatively small depth.

Figure 7:
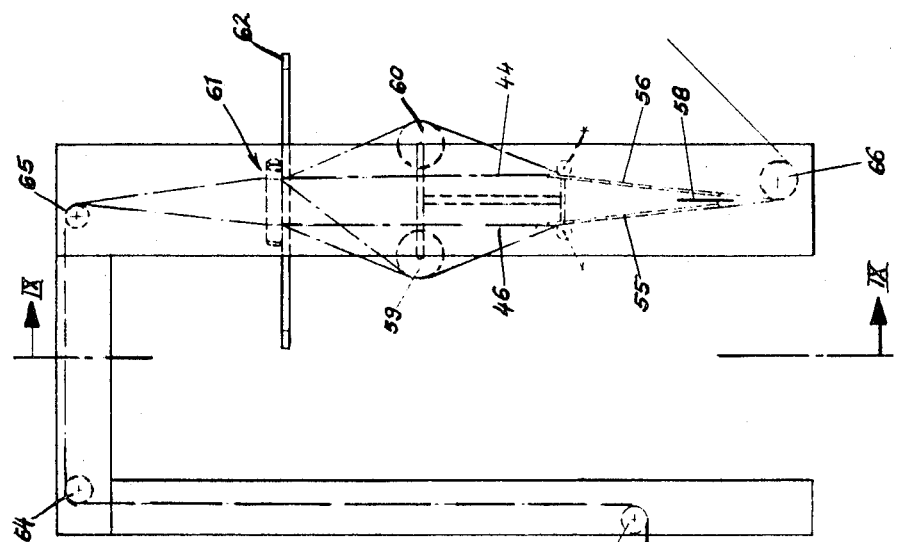
FIG. 7 is a diagrammatic side elevation showing a tube-making machine for manufacturing the gusseted tube of FIG. 6.
Figure 9:
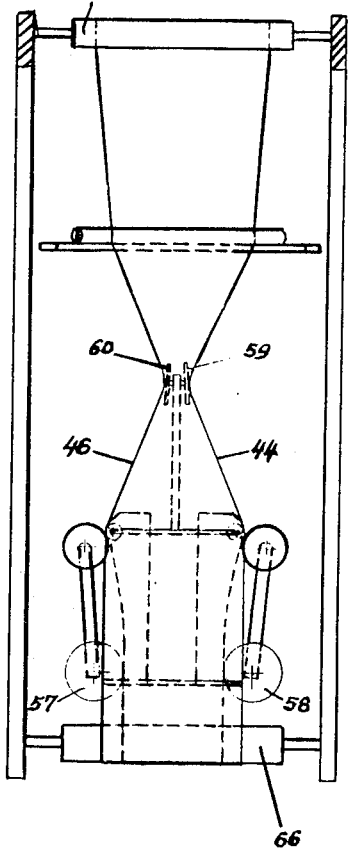
FIG. 9 is a sectional view taken on line IX–IX of FIG. 7.
Figure 8:
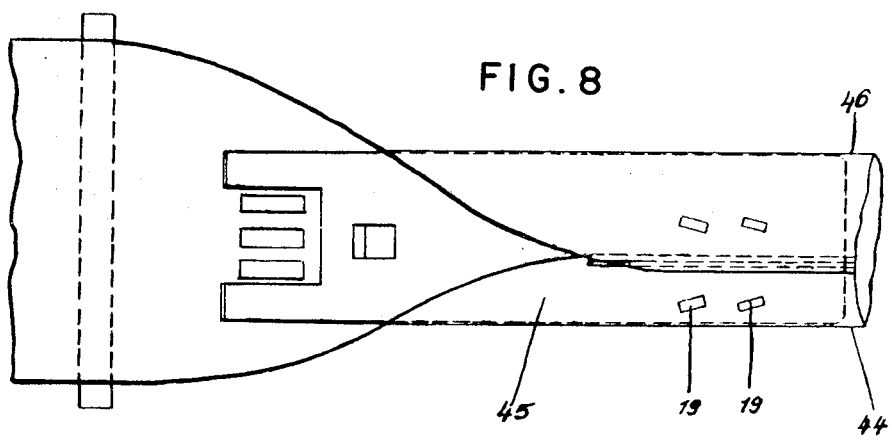
FIG. 8 is a top plan view showing that part of the machine of FIG. 7 which serves for making the flat tube.

The flat tube-forming device shown in FIGS. 7 and 8 is exactly the same as that in FIGS. 3 and 4 and for this reason need not be explained once more. It is pointed out, however, that much more space is available for the engagement of the oblique rollers 19 with the side portion 45 of the web because different from the suggestion illustrated in FIGS. 1 to 4, the width of the side portion 45 of the web is twice the depth of the gussets to be subsequently formed.

The resulting flat tube, having the side edges 44 and 46 and corresponding to the tube shown in FIG. 5, is now fed to a known device, in which a portion of each ply of the flat tube is subjected to the zigzag folding described with reference to FIGS. 5 and 6 to form the gussets while the side edges of the flat tube are preserved.

The device which succeeds the tube-shaping device is suitably vertically disposed and has also two size plates 55, 56, which are disposed in the tube and pull open the tube to a rectangle and then converge in the direction of movement. The device comprises also rotating discs 57 and 58, which are disposed outside the tube and tuck in the gussets. The tube is pulled open at right angles to the previous plane of the flat tube by a spreading device 59, 60 disposed within the tube and is supplied to this gusseting device after having been turned to such an extent that the previous side edges 44 and 46 of the flat tube are fed to the corresponding edges of the size plates 55 and 56, as is indicated in FIG. 7 by dash-dot lines in the spreading area. The turning of the flat tube to the extent which is required in view of the desired depth of the gussets is effected by a pair of guide rolls 61, which are mounted by means not shown in a ring 62, which is rotatably and adjustably mounted, also by means not shown. The flat tube is supplied to the turning and gusseting device from above by means of the guide rollers 63 to 65. The finished gusseted tube is withdrawn by a deflecting roller 66, which is disposed under the device.

What I claim is:

1. A process of manufacturing valved and gusseted sacks of plastic material, which comprises turning over the side portions of a flat web of plastic material sheeting and joining its overlapping edges by heat-sealing to form a tube, which is subsequently processed to form individual sacks, applying a plurality of valve patches at spaced locations to the edge of one side portion of the web before the tube is formed, and joining the valve patches by heat-sealing to the other edge of the web during the formation of the heat-sealed seam, flattening the tube initially formed with the heat-sealed seam spaced from both side edges but nearer to one, forming a gusset in one side edge of the tube using the whole of that portion of the said one edge of the tube which lies between said one side edge of the flat tube and the heat-sealed seam such that said heat-sealed seam lies at an outer gusset fold.

2. A process according to claim 1, characterized in that the heat-sealed seam is initially spaced from the one side edge of the flat tube by the desired gusset depth, and both side edges of the flat tube are tucked in during the formation of the gussets.

3. A process according to claim 1, characterized in that the heat-sealed seam is formed at a distance from the one side edge of the flat tube which is twice the desired gusset depth, and the gusset adjacent to the plurality of valve patches is formed so that the inner fold of said gusset is disposed midway between the one side edge of the flat tube and the heat-sealed seam.